United States Patent [19]

Skinner

[11] Patent Number: 5,481,722
[45] Date of Patent: Jan. 2, 1996

[54] METHOD AND APPARATUS FOR MERGING CHANGE CONTROL DELTA STRUCTURE FILES OF A SOURCE MODULE FROM A PARENT AND A CHILD DEVELOPMENT ENVIRONMENT

[75] Inventor: Glenn Skinner, Mountain View, Calif.

[73] Assignee: Sun Microsystems, Inc., Mountain View, Calif.

[21] Appl. No.: 338,883

[22] Filed: Nov. 14, 1994

Related U.S. Application Data

[63] Continuation of Ser. No. 84,078, Jun. 28, 1993, abandoned, which is a continuation of Ser. No. 746,957, Aug. 19, 1991, abandoned.

[51] Int. Cl.$^6$ .............................. G06F 15/16; G06F 7/22; G06F 13/00
[52] U.S. Cl. .................... 395/700; 395/600; 364/222.81; 364/222.82; 364/222.9; 364/DIG. 1; 364/962; 364/962.1; 364/962.2; 364/962.3; 364/962.4; 364/963.3; 364/DIG. 2
[58] Field of Search ..................................... 395/650, 700

[56] References Cited

U.S. PATENT DOCUMENTS

| | | | |
|---|---|---|---|
| 4,558,413 | 12/1985 | Schmidt et al. | 364/300 |
| 4,809,170 | 2/1989 | Leblang et al. | 364/200 |
| 4,875,159 | 10/1989 | Cary et al. | 364/200 |
| 4,912,637 | 3/1990 | Sheedy et al. | 364/300 |
| 5,084,815 | 1/1992 | Mazzario | 395/800 |
| 5,274,803 | 12/1993 | Dubin et al. | 395/600 |

OTHER PUBLICATIONS

"An Introduction to the Source Code Control System" by Eric Allman, Project Ingres, University of California at Berkeley, from the UNIX Programmer's Supplementary Documents vol. 1, 1986, pp. PSI:14–1 to 15.
"An Introduction to the Revision Control System" by Walter F. Tichy, Department of Computer Sciences, Purdue University, from the UNIX Programmer's Supplementary Documents vol. 1, 1986 pp. PSI: 13–1 to PSI: 13–21.
Adams, et al., "Object Management in a CASE Environment", *The 11th Int'l Conference on Software Engineering–Proceedings*, May 16, 1989, pp. 154–163.
Tichy, W. F., "Design, Implementation, and Evaluation of a Revision Control System", *The 6th Int'l. Conference on Software Engineering–Proceedings*, Sep. 13, 1982, pp. 58–67.
Walpole, et al., "Maintaining Consistency in Distributed Software Engineering Environments", *The 8th Int'l. Conference on Distributed Computing Systems*, Jun. 13, 1988, pp. 418–425.
Bigelow, J., "Hypertext and Case", *IEEE Software*, vol. 5, No. 2, Mar. 1988, pp. 23–27.
"Design Implementation, and Evaluation of a Revision Control System" by Walter F. Tichy, 1982 pp. 58–67, IEEE.
"RCS–A System for Version Control" by Walter F. Tichy, 1985, pp. 637–654, Software Practice and Experience.
"The Source Code Control System" by Dr. Rebecca Thomas, pp. 69–71, 1984 Unix/World.

*Primary Examiner*—Kevin A. Kriess
*Assistant Examiner*—Michael T. Richey
*Attorney, Agent, or Firm*—Blakely Sokoloff Taylor & Zafman

[57] ABSTRACT

A source module and its changes in a parent and a child development environment of an hierarchy of development environments are created as a first and a second delta structure in their respective environments. Various procedures and working tables/files are provided to merge the second delta structure into the first delta structure whenever the latest revision of the source module in the parent environment is reconciled to the latest edition of the source module in the child environment, and to merge the first delta structure into the second delta structure whenever the latest edition of the source module in the child environment is resynchronized to the latest revision of the source module in the parent environment. As a result, as the process is repeated by other parent and child environments of the hierarchy, change deltas are created and propagated among the environments without any loss in change history.

17 Claims, 14 Drawing Sheets

METHOD AND APPARATUS FOR MERGING CHANGE CONTROL DELTA STRUCTURE FILES OF A SOURCE MODULE FROM A PARENT AND A CHILD DEVELOPMENT ENVIRONMENT

This is a continuation of application Ser. No. 08/084,078 filed on Jun. 28, 1993 which is a continuation application of prior application Ser. No. 07/746,957 filed on Aug. 19, 1991, now both abandoned.

BACKGROUND OF THE INVENTION

1. Field of the Invention

This invention relates to the field of source code control for computer software development. More particularly, the present invention relates to the steps and means employed for merging two change control delta structure files of a source module from a parent and a child development environment.

2. Art Background

Typically in a large software development project 10 (FIG. 1a), several programmers, or programming groups 12a–12d, work in conjunction with one another to develop a single piece of software 14. As illustrated in FIG. 1a, the software is logically divided into sections 16a–16d and 18a–18d which a different person or group 12a–12d writes, debugs and updates.

Different source code management software has been developed to provide an efficient means for coordinating and documenting the programming activities of a development group, e.g. the Source Code Control System (SCCS), and the Revision Control System (RCS). A source code management system 20 (FIG. 1b) typically controls the changes to a source module 22 by becoming the custodian of the source module. To save storage space, typically only the original base 24a and a description of each subsequent change (delta) 24b–24d are stored. Additionally, the source code management system 20 has a collection of utilities (not shown) for managing the retrieval 26b and saving 26c of any edition of a source module 28a and 28b. Once a source module 22 is incorporated 26a into the management system 20, an edition of the source module 24a–24c may be retrieved 26b, and saved 26c only by using the appropriate utilities of the management system 20.

For example, under SCCS, when a source module "program.c" 32 (FIG. 1c) is placed under its control 36a, SCCS places the source module 34a into a control file "s.program.c" 34 and assigns a SCCS identification number (SID) "1.1", indicating its edition level. From then on, a developer has to use the appropriate SCCS utility (not shown) to "get" 36b edition "1.1" of "program.c" 38a to make changes to it. Similarly, after changes are made, the developer has to use the appropriate SCCS utility to "store" 36c the changes. SCCS then captures the changes as an incremental delta 34b to the original source module 34a, places the delta 34b inside the control file "s.program.c" 34, and assigns the delta 34b a new SID "1.2", indicating its new edition level. To satisfy a subsequent request for edition level "1.2" of "program.c", SCCS builds edition level "1.2" by combining the original source module 34a and the incremental delta 34b.

For further description of SCCS and RCS, see Rochkind, M. J., *The Source Code Control System,* National Conference on Software Engineering, 1st Proceeding, Washington D.C., Sep. 11–12, 1975, pp. 37–43 (IEEE Computer Society 1975); Thomas, R., *"The Source Code Control System,* Unixworld, Vol. 1, No. 3, pp. 69–71 (1984); Tichy, W. F., *Design, Implementation and Evaluation of a Revisions Control System,* IEEE 6th Conference on Software Engineering, Sep. 13–16, 1982, Tokyo, Japan, pp. 58–67.

In practice, at any particular point in time, in addition to the version under development 42a, 42b, or 42c (FIG. 2a), which is constantly being updated to fix bugs, add new features, and optimize existing facilities, there are other versions under test 44a or 44b and supported in the field 46, which are also being updated to fix bugs and add new features. Thus, many computer systems offer support for hierarchies of inter-related environments for software development. For example, the Network Software Environment (NSE) supported on the Sun workstations manufactured by Sun Microsystems, Inc. of Mountain View, Calif. (Sun is a registered trademark of Sun Microsystems, Inc.).

An environment 60 or 61 is a named envelope of a collection of objects 64, 66 or 65, 67 (FIG. 2b). Typically, the objects are organized under a directory 62, 63. An environment 60 or 61 may be created on any machine 52, 54, 56, or 58 in a network of computers 50. An object 64, 65, 66 or 67 is a named data container. An object 64, 65, 66 or 67 may be a simple object 66 or 67 or a compound object 64 or 65. A simple object 66 or 67, is an object that does not contain other objects, for example, a source file. A compound object 64 or 65 is a list of other objects, including other compound objects, for example, a component containing a list of its source files. The objects 64, 65, 66, and 67 of an environment 60, 61 may be physically located on any machine 52, 54, 56 or 58 in the network 50.

Typically, environments 71–76 are logically organized into an hierarchy 70 (FIG. 2c). For example, a software development project may comprise a grandparent release environment 71 for holding the latest revision of the project 80 and earlier revisions that have been released to the customers (not shown), a plurality of parent integration environments 72, 73, each holding the latest revision of a component 81 or 82 of the project and earlier revisions under test (not shown), and a plurality of child development environments 74, 75, and 76, each holding the latest editions of various subcomponents 83–86 being modified by the individual developers and earlier editions (not shown). The logical relationship between the environments may be redefined at any particular instant of time.

A developer who wishes to modify an object acquires a new edition of the object 92 or 93 into one of the child environments from the latest revision of the object 91 in the child's parent environment (FIG. 2d). After modifying the new edition of the object 92 or 93 in the child environment, the developer incorporates the modifications into the latest revision of the object 91 or 96 in the parent environment by reconciling the latest revision of the object 91 or 96 to the modified edition of the object 94 or 95 in the child environment. If the latest revision of the object 91 in the parent environment is the same revision of the object 91 in the parent environment previously acquired for the modified edition of the object 94 in the child environment, the reconciliation process is successful, resulting in a new latest revision of the object 96 being made in the parent environment.

If the latest revision of the object 96 in the parent environment is not the same revision of the object 91 in the parent environment previously acquired for the modified edition of the object 95 in the child environment, the reconciliation process is unsuccessful, resulting in the initiation of the resynchronization process to incorporate the modifications to the latest revision of the object 96 into the latest edition of the object 95 in the child environment. The resynchronization process acquires a new edition of the object 97 into the child environment from the new latest revision of the object 96 in the parent environment. After resolving the differences between the modified edition of the object 95 and the acquired new edition of the object 97, the latest revision of the object 96 in the parent environment is reconciled again to the consolidated edition of the object 98 in the child environment. Since the latest revision of the object 96 in the parent environment has remained unchanged, the reconciliation process is successful, resulting in another new latest revision of the object 99 being made in the parent environment.

For further description of the Network Software Environment, see *Network Software Environment,* Reprint of of Sun Technical Report, FE 197-0 (copyright 1989, Sun Microsystems, Inc.).

The traditional source code management systems, when used in the context of an hierarchy of inter-related of software development environments have at least one significant disadvantage of not being able to capture the entire history of changes to the source module. This is illustrated by reference to FIG. 2e. Assume a first and second child environments (C1 and C2) 134, 136 each acquired revision 1.1 of a source module 102c and 102d, from their grandparent environment (GP) 130 through their parent environment (P) 132. C1 creates editions 1.2, 1.3 and 1.4, which are maintained as three deltas (i.e. changes), 104, 106, and 108, in his environment 134. Similarly, C2 creates editions 1.2, 1.3, which are also maintained as two deltas, 110 and 112, in his environment 136.

When C1 reconciles the latest revision 1.1 in P to his latest edition 1.4, only a single revision 1.2, maintained as a single delta 114b, is created for the delta structure 114a, in P. The details of the delta structure 104, 106 and 108 (i.e., the history outlining the changes performed), are lost. Now, when C2 attempts to reconcile the latest revision 1.2 in P to his latest edition 1.3, his latest edition 1.3 is automatically resynchronized with the latest revision 1.2 in P, resulting in a copy of the latest revision 1.2 in P (not shown) being made in C2. C2 resolves the difference, creating a new edition 1.4, maintained as a delta 116, in his environment 136. When C2 reconciles the latest edition 1.2 in P to his latest edition 1.4, again only a single revision 1.3, maintained as a single delta 118b, is created for the entire delta structure 118a, in P. The details of the delta structure 110, 112, and 116, (i.e., the history outlining the changes performed in C2), are lost.

Similarly, if the latest revision 1.1 in GP is reconciled to the latest edition 1.3 in P, a single edition 1.2, maintained as a single delta 120b, is created for the delta structure 120a, in GP. Thus, if an uncle environment (U) 138, subsequently acquires the latest revision 1.2 in GP, he sees a single change, maintained as a single delta 120c, in U. He does not have access to any of the details that make up the single delta 120c (i.e., the history outlining the changes performed in C1 and C2).

SUMMARY OF THE INVENTION

It is therefore an object of the present invention to provide an improved change control system for source modules, in particular, source modules in at least two inter-related development environments.

It is an object of the present invention to provide an improved change control system for source modules, in particular, source modules in an hierarchy of inter-related software development environments.

The method and apparatus of the present invention achieves these objects, by representing a source module and changes to the source module in two inter-related software environments as two hierarchies of incremental deltas, and merging the hierarchies without aggregating any of the incremental deltas in either hierarchy, when the latest revision (edition) of the source module in one of environment is reconciled (resynchronized) to the latest edition (revision) of the source module in the other environment.

The method and apparatus of the present invention accomplishes the merging of the hierarchies of incremental deltas by building a replacement combined delta structure. The method and apparatus of the present invention builds the different portions of the replacement combined delta structure separately, including the detailed list of deltas and a relationship table. Various steps and means are employed to provide two way cross references between the deltas in the old hierarchies, and the deltas in the combined hierarchy, to determine whether a new branch is required for the replacement combined delta structure, to assign delta identifications, to link predecessor and successor deltas, and to assign revision/edition level identification.

NOTATIONS AND NOMENCLATURE

Figure 1A:
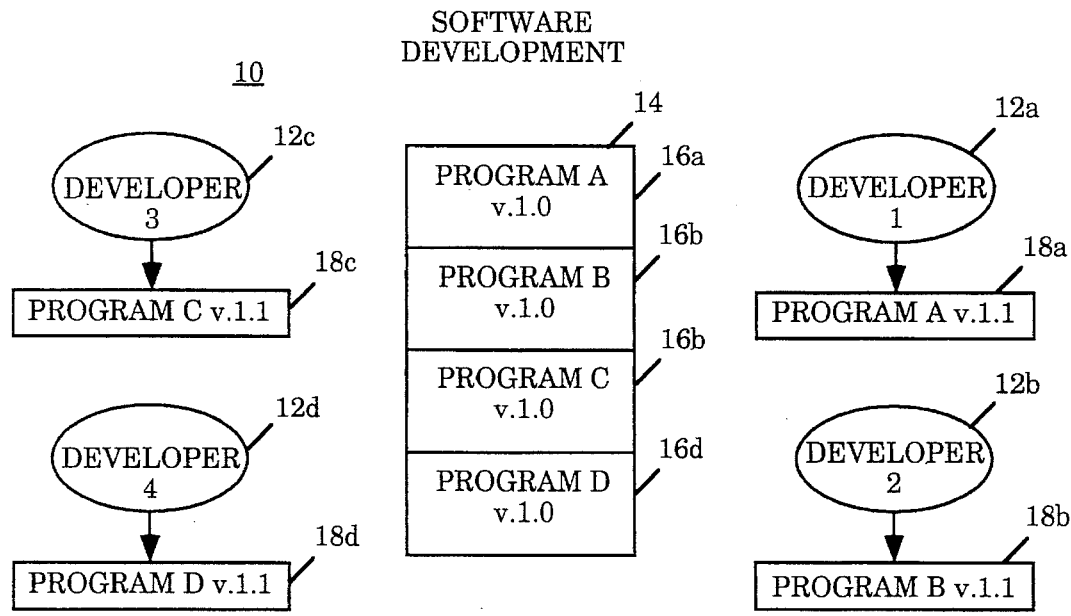
FIGS. 1a–1c illustrate a typical prior art source code management system in a single software development environment.
Figure 1B:
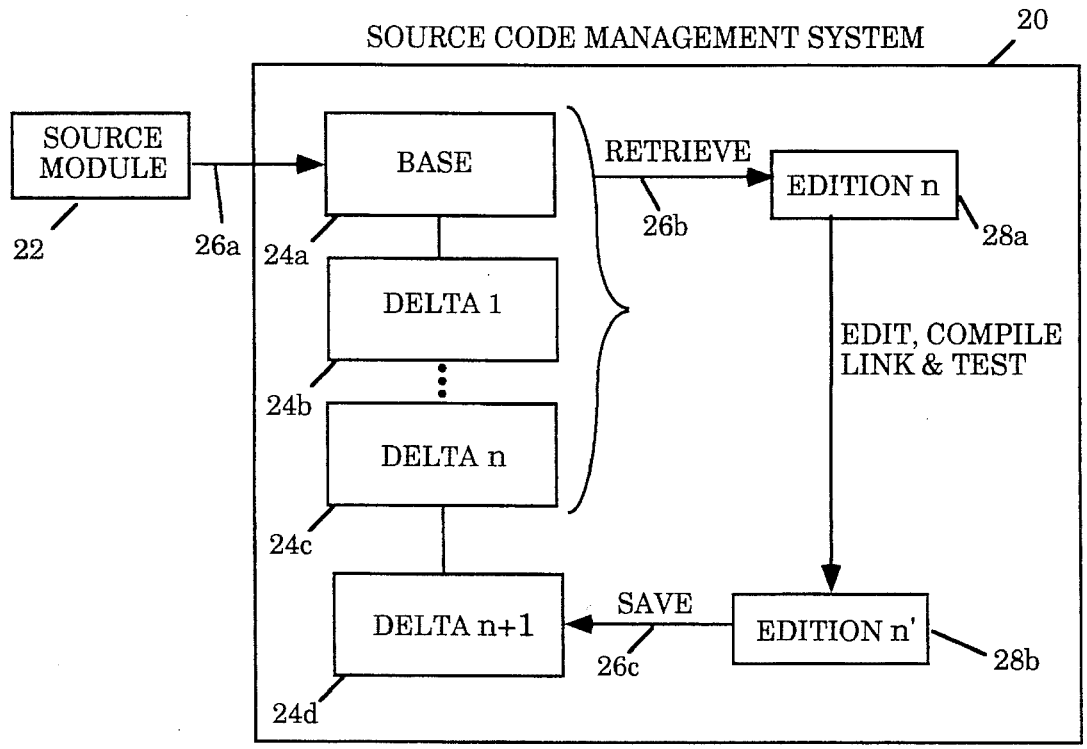
Figure 1C:
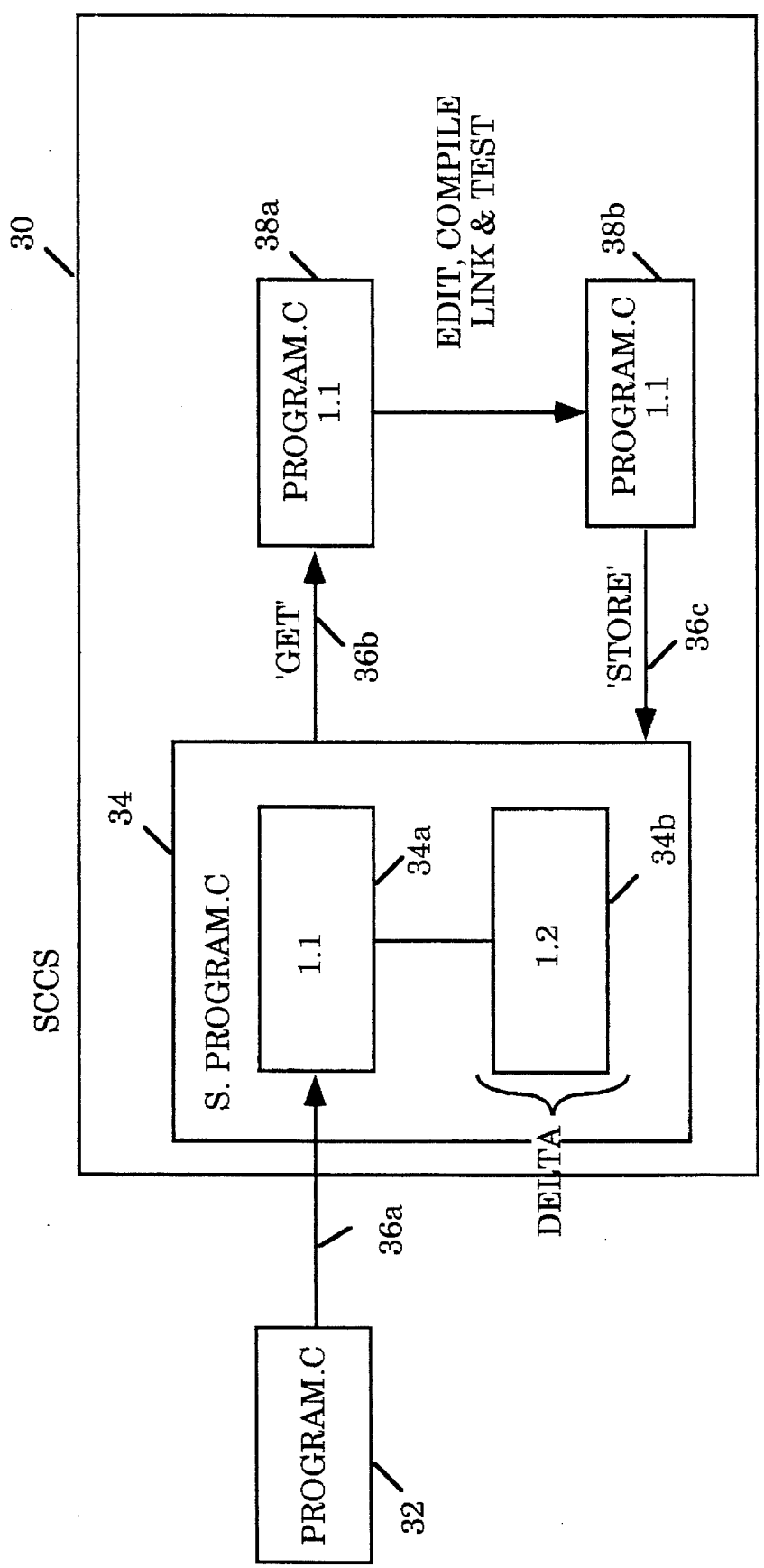
Figure 2A:
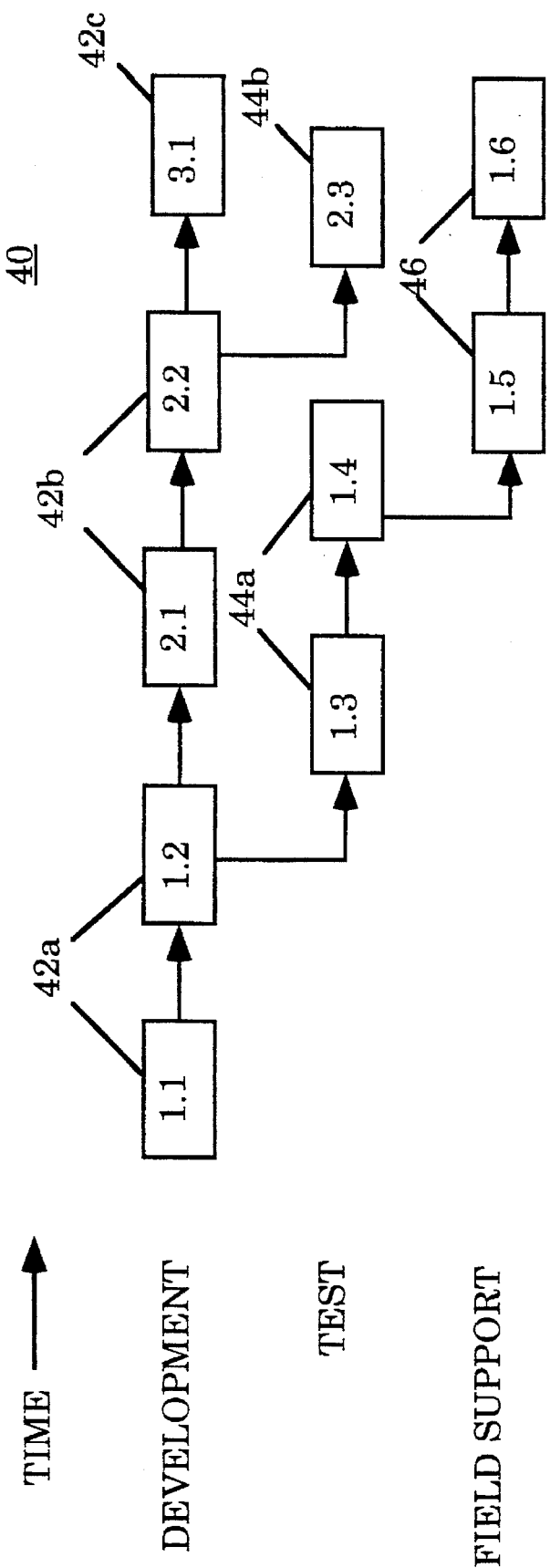
FIGS. 2a–2e illustrate typical prior art source code management systems in an hierarchy of inter-related software development environments.
Figure 2B:
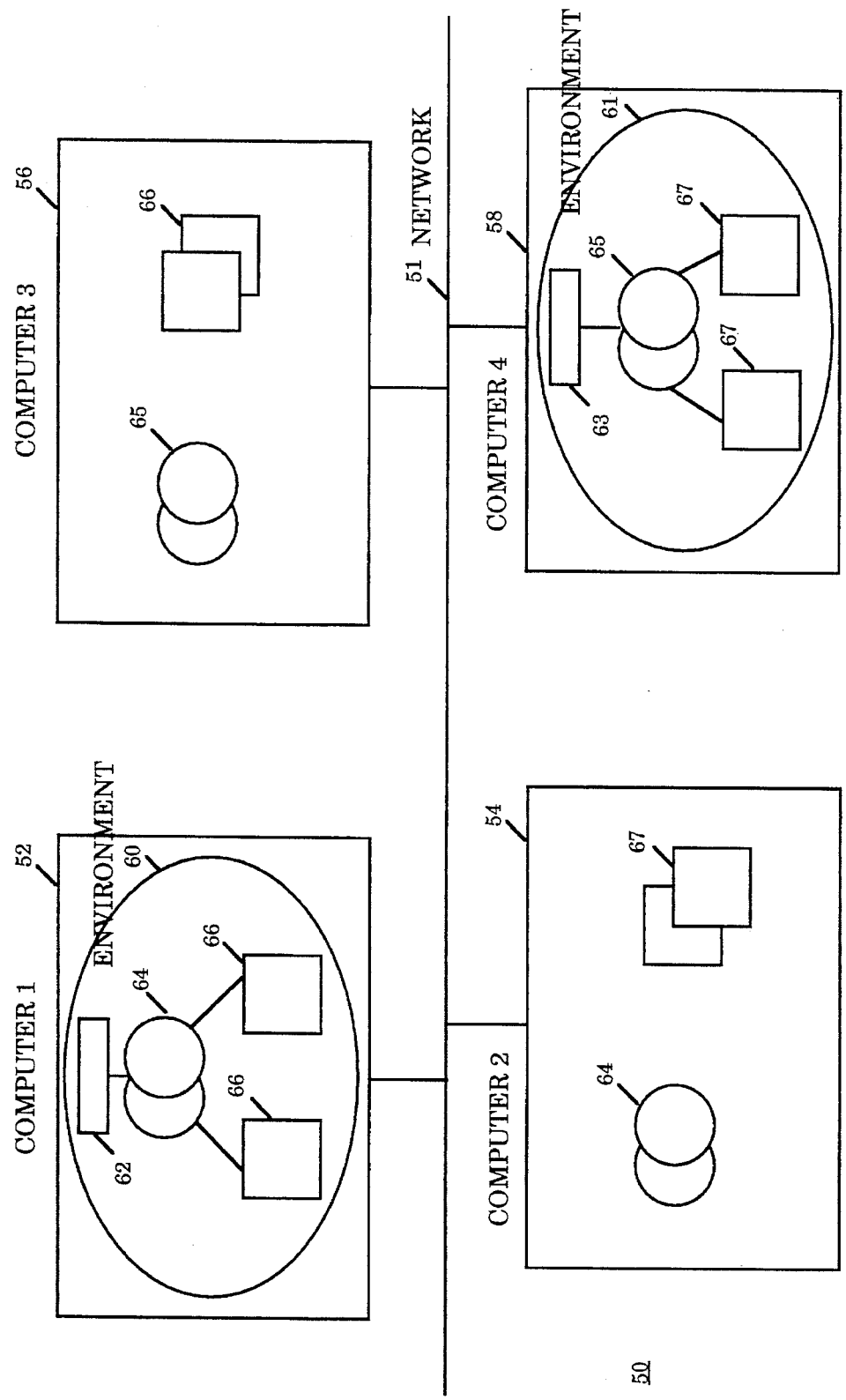
Figure 2C:
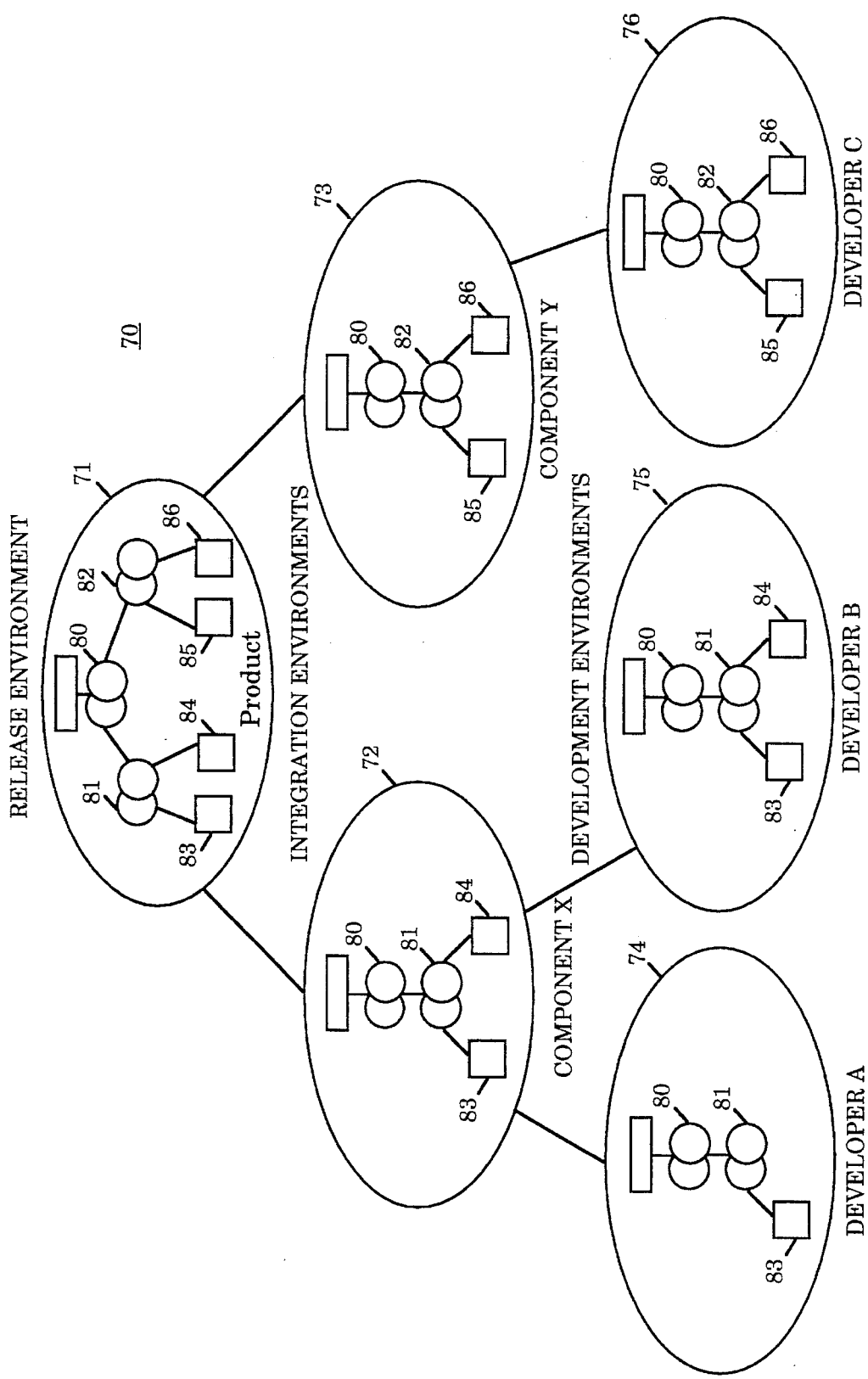
Figure 2D:
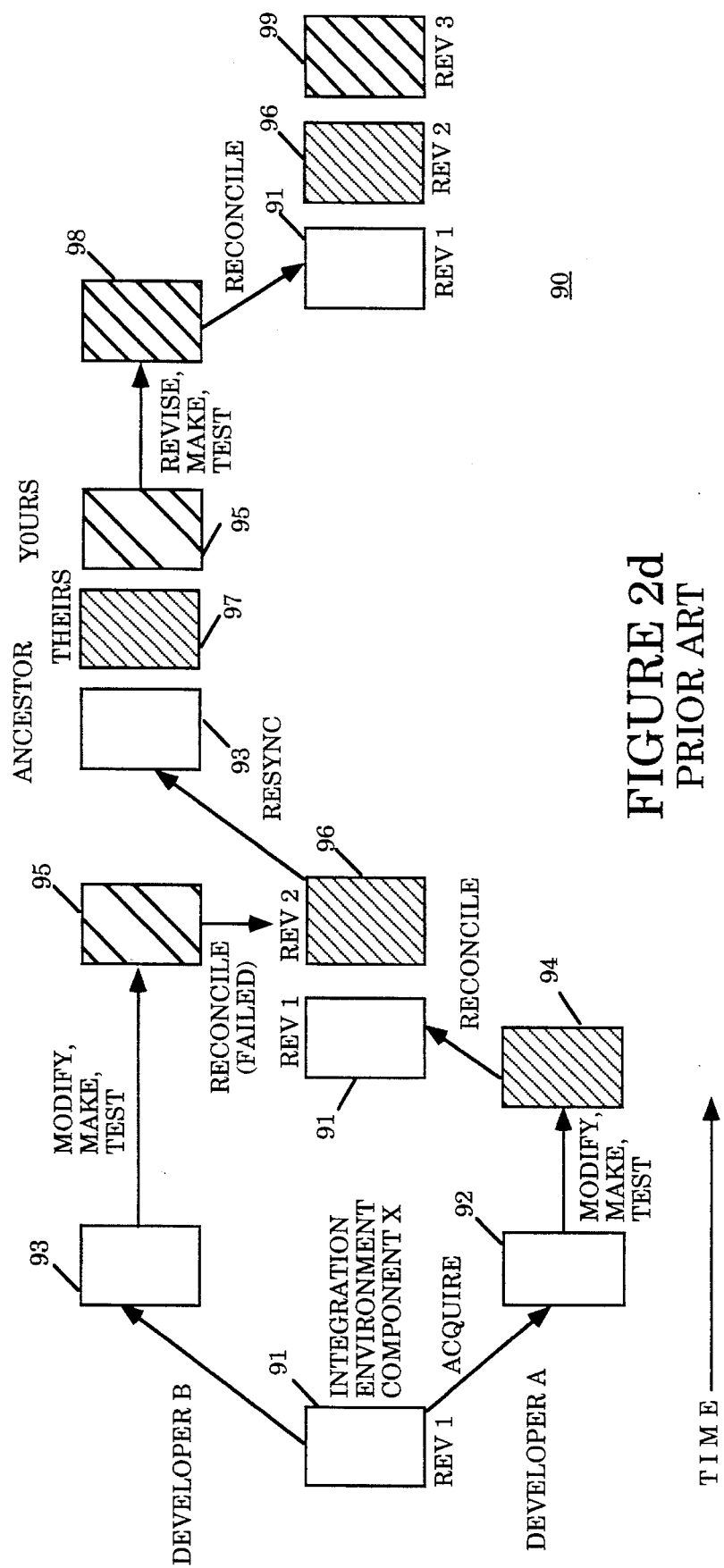
Figure 2E:
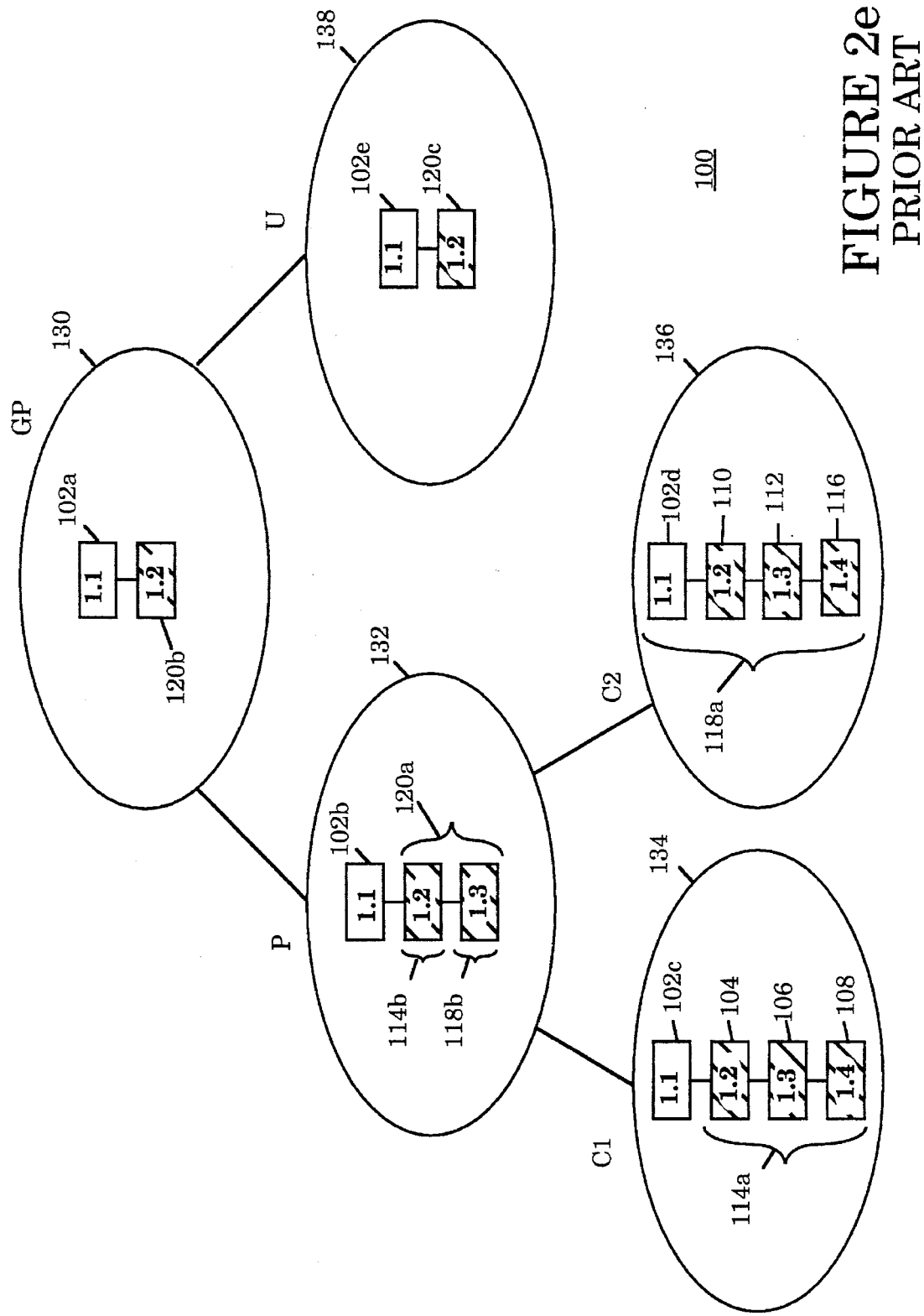

The detailed description which follows is presented largely in terms of program procedures executed on a network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for controlling changes to a source module is disclosed, which has particular application to software development in at least two inter-related development environments. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 3:
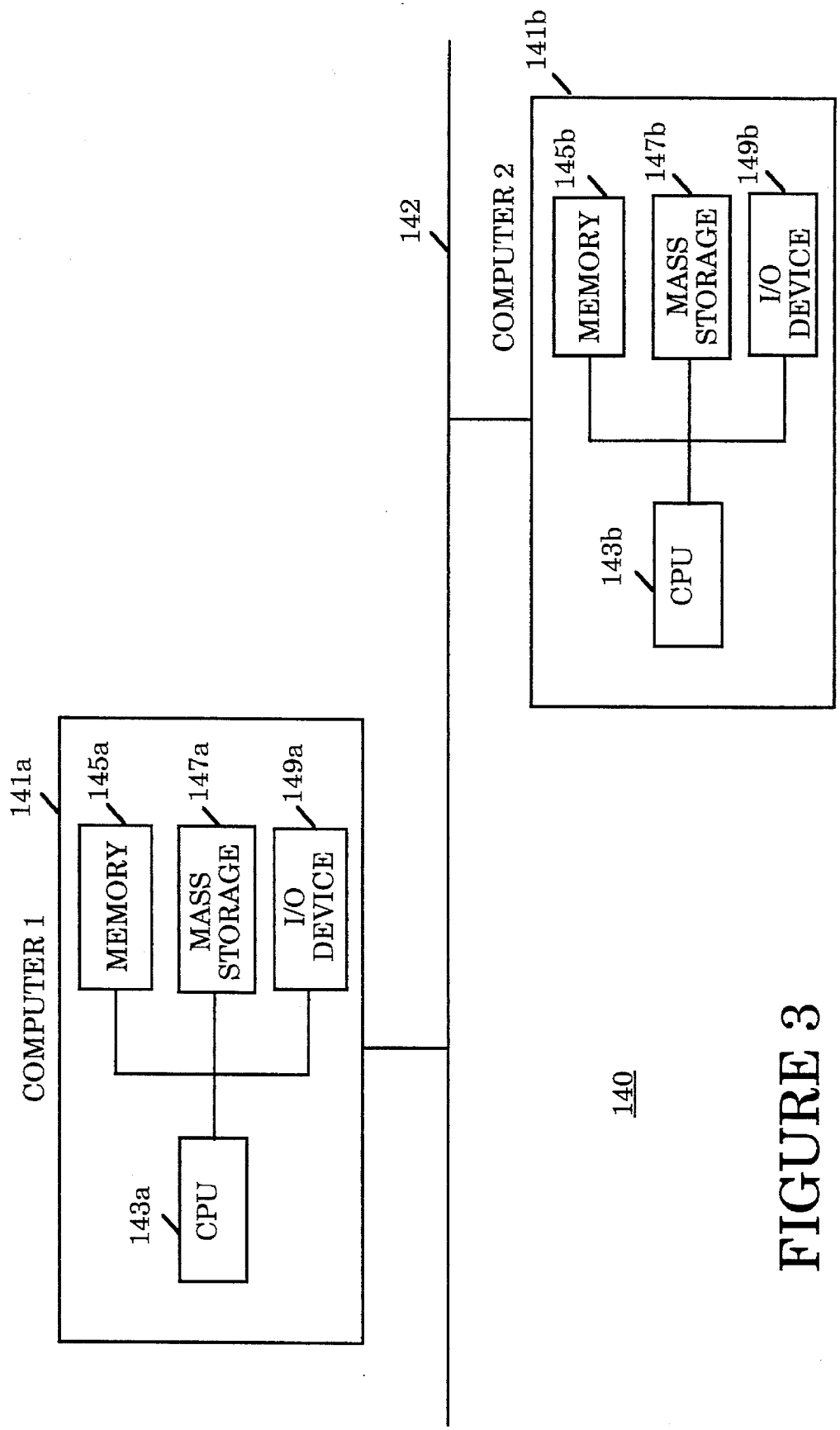
FIG. 3 illustrates a physical view of a network of computer systems employed by the present invention organized by the hardware elements.

Referring now to FIG. 3, a block diagram illustrating a physical view of a network of computer systems used by the present invention organized by its hardware is shown. The network of computer systems 140 comprises at least one computer system 141a. If more than one computer system 141a and 141b are employed, the computer systems 141a and 141b are coupled to each other through a network 142. Each computer system 141a or 141b comprises a central processing unit (CPU) 143a or 143b, a memory unit 145a or 145b, a mass storage unit 147a or 147b and an input/output (I/O) device 149a or 149b. The characteristics of these hardware elements on each of the computer systems 141a or 141b, such as speed, size, may differ from each other. These hardware elements are those typically found in most general purpose computer systems and almost all special purpose computer systems. In fact, the several hardware elements contained within each of the computer system 141a and 141b are intended to be representative of this broad category of data processing systems. Particular examples of suitable data processing systems to fill the role of these computer systems 141a and 141b include computer systems manufactured by Sun Microsystems, Inc., Mountain View, Calif. Other computer systems having like capabilities may of course be adapted in a straightforward manner to perform the functions described below.

Figure 4:
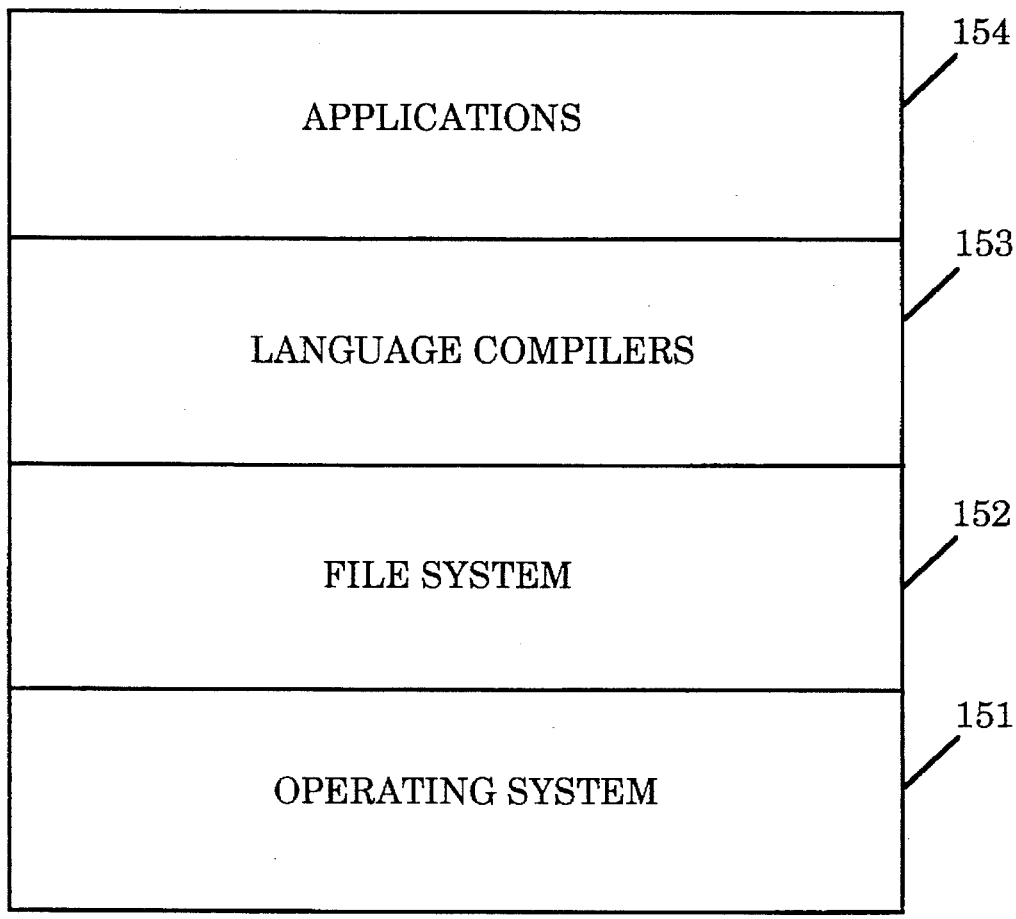
FIG. 4 illustrates a logical view of a typical computer system employed by the present invention organized by the system software.

Referring now to FIG. 4, a block diagram illustrating a logical view of a typical computer system used by the present invention organized by its system software is shown. The system software 150 comprises an operating system 151, a file system 152, and at least one language compiler 153. The applications 154 executing on the computer systems 150 utilize the underlying system services offered by system software 151–153. The system software used on each of the computer systems may be different provided they offer equivalent functions and capable of communicating with each other. These software elements are those typically found in most general purpose computer systems and almost all special purpose computer systems. In fact, the several software elements contained within each of the computer systems are intended to be representative of this broad category of system software. Particular examples of suitable system software to fill the role of these system software 150 of the computer systems used by the present invention include the UNIX operating system, its file system and its Shell command language (UNIX is a registered trademark of AT&T). Other system software having like capabilities may of course be adapted in a straightforward manner to perform the functions described below.

Figure 5:
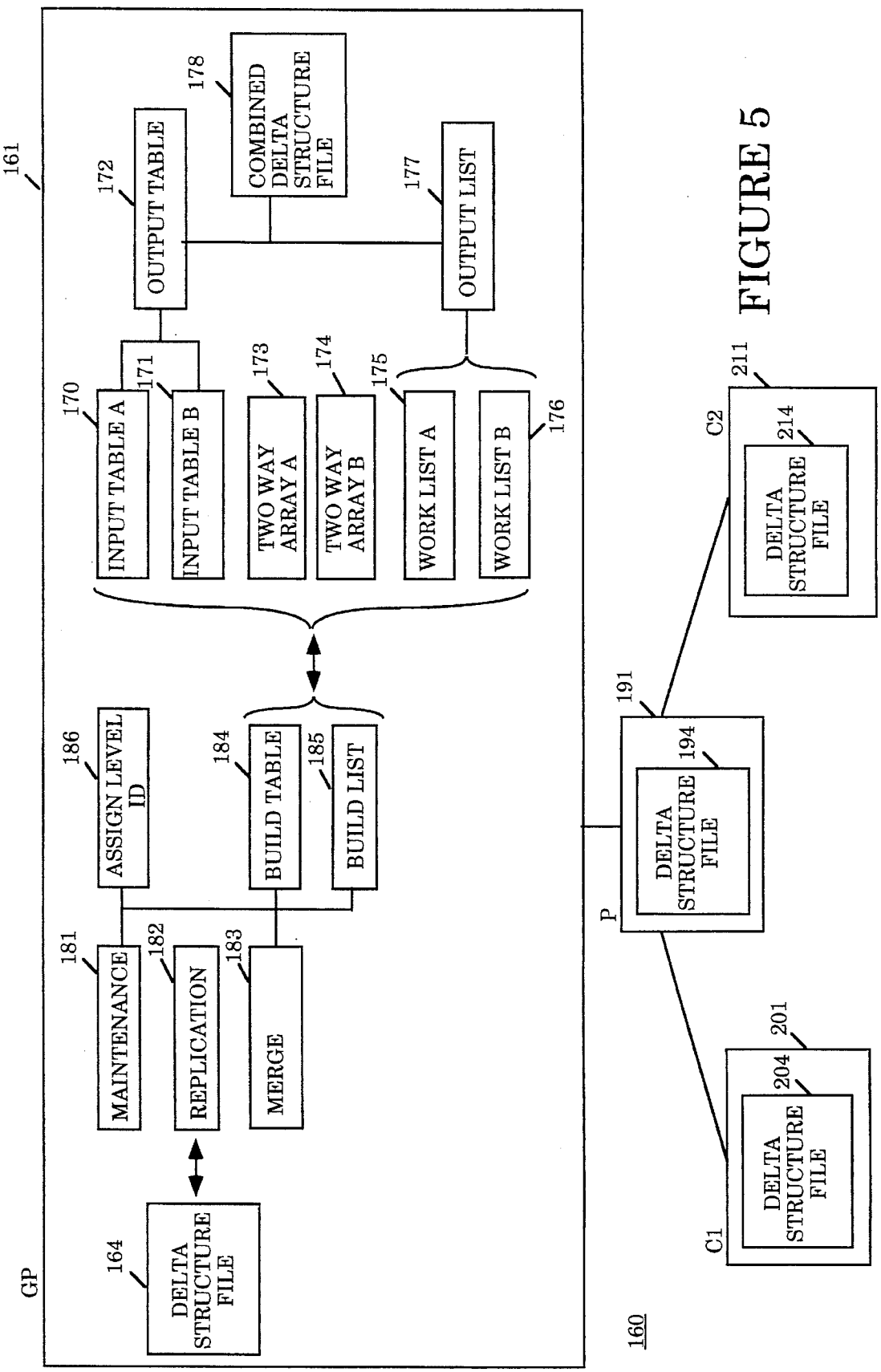
FIG. 5 illustrates a logical view of the preferred embodiment of the apparatus of the present invention in the context of an exemplary hierarchy of interrelated software development environments.

Referring now to FIG. 5, a block diagram illustrating a logical view of the preferred embodiment of the apparatus of the present invention in the context of an exemplary hierarchy of interrelated software development environments is shown. The preferred embodiment of the apparatus of the present invention comprises a plurality of procedures 181–186 being executed, and a plurality of delta structure files 164, 194, 204, and 214, and a plurality of working files 170–177 being stored, on the network of computer systems comprising the system software described above. The procedures 181–186, in conjunction with the delta structure files 164, 194, and 204, 214 and the working files 170–177 allow the changes to a source module to be controlled in the exemplary hierarchy of interrelated software development environments 160 without losing any of the change history details. Although the method and apparatus of the present invention will be described in the context of controlling changes to a source module in an exemplary hierarchy of interrelated software development environments, it should be noted that the present invention is not limited to single source module nor hierarchical software development environments. The present invention applies to controlling changes to any number of source modules in any two interrelated software development environments. The interrelated software development environments may be organized in any topology.

The procedures comprise a maintenance procedure 181, a replication procedure 182, a merge procedure 183, a build table procedure 184, a build list procedure 185, and an assign level identification procedure 186. The procedures 181–186 (shown being executed in the grandparent (GP) environment 161) may be executed in any of the development environments 161, 191, 201 or 211, or any combination of the development environments 161, 191, 201 and 211. Furthermore, the same copies of these procedures 181–186 may be shared and accessed among the development environments 161, 191, 201 and 211, in a variety of manners using the system services provided by the system software described above.

The delta structure files comprise at least one delta structure file 164, 194, 204 or 214, one for each environment 161, 191, 201 or 211. As described earlier, the delta structure files 164, 194, 104 and 214 may be accessed by the procedures 181–186 in a variety of manners, using the system services of the system software described above. The working files 170–177 comprise input tables A and B, 170 and 171, an output table 172, two way associative arrays A and B, 173 and 174, working lists A and B, 175 and 176, and a combined delta structure 177. Similarly, the working files 170–177 (shown being stored in the grandparent (GP) environment 161) may be stored in any of the development environments 161, 191, 201 or 211, or any combination of the development environments 161, 191, 201 and 211. Likewise, the same copies of these working files 170–177 may be shared and accessed among the development environments 161, 191, 201 and 211, in a variety of manners, using the system services provided by the system software described above.

Figure 6:
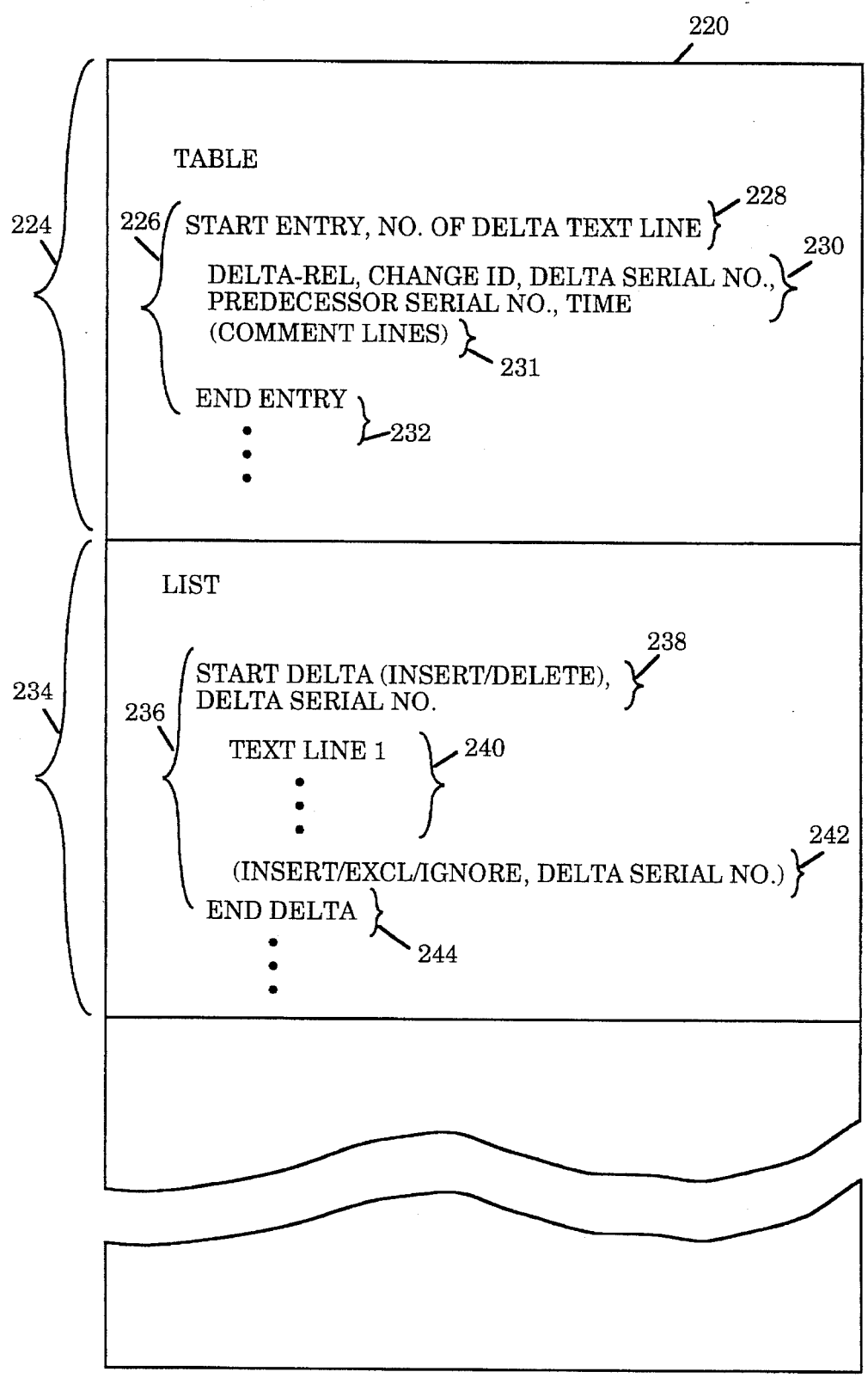
FIG. 6 illustrates a partial logical view of the delta structure file used by the method and apparatus of the present invention.

Referring now to FIG. 6, a block diagram illustrating a partial logical view of the delta structure file used by the present invention is shown. Each delta structure file is for storing a source module and its subsequent changes as an hierarchy of incremental deltas. The original form of the source module is stored as a root delta. Changes to the source module and its revisions/editions are stored as incremental deltas. The delta structure file may be implemented with a variety of logical organizations. The preferred embodiment of the present invention employs the logical organization supported by SCCS. A SCCS compatible delta structure file 220 comprises a table of delta relationships 224, and a list of change deltas 234.

The table of delta relationships 224 comprises at least one time ordered table entry 226, describing a particular delta relationship between two deltas. Each time ordered table entry 226 comprises an entry start control line 228, followed by a delta relationship line 230, followed by zero or more comment lines 231, and ending with an entry end control line 232. Each delta relationship line 230 comprises an entry relationship line code denoting the nature of the line, a change identifier indicating the revision/edition level of the entry's corresponding delta, a delta serial number identifying the entry's corresponding delta, and a predecessor serial number identifying the entry's corresponding delta's predecessor. Each entry start control line 228 comprises an entry control line code indicating the beginning of a table entry, and the number of lines inserted, deleted and unchanged in the entry's corresponding delta. The number of lines inserted or deleted may be zero. Each comment line 231 comprises an entry comment line code denoting the nature of the line, followed by a line of descriptive commentary. Each entry end control line 232 comprises an entry control line code indicating the end of a table entry.

The list of change deltas 234 comprises at least one delta 236 capturing at least one change. Each delta 236 comprises a delta start control line 238, followed by zero or more delta text lines 240, and ending with a delta end control line 244. Each group of delta text lines 240 reflects a particular change. Each delta start control line 238 comprises a delta control line code indicating the beginning of a delta, a delta action code indicating whether the delta text lines are to be inserted or deleted, and a delta serial number uniquely identifying the delta. Each delta end control line 244 comprises a delta control line code indicating the end of a delta.

Referring back to FIG. 5, input tables A and B, 170 and 171, the output table 172, two way arrays A and B, 173 and 174, working lists A and B, 175 and 176, the output list 177, and the combined delta structure 178, are for building a combined delta structure file, based on a parent and a child delta structure file. The input tables A and B, 170 and 171, are for storing the parent and child delta relationship tables. The output table 172 is for storing the combined delta relationship table. Therefore, the input tables A and B, 170 and 171, and the output table 172 have the same format as the parent and child delta relationship tables described earlier. The two way arrays A and B, 173 and 174, are for cross referencing the deltas in the input tables A and B, 170 and 171, and the combined deltas in the output table 172, to each other. Each of the two way arrays, A or B, comprises a plurality of two way cross references (not shown). Each two way cross reference cross references a delta in input table A or B to a delta in the output table and vice versa. The cross references are maintained using the corresponding delta serial numbers in each table. The working list A and B, 175 and 176, are for storing the parent and child lists of deltas. The output list 177 is for storing the combined list of deltas. The combined delta structure 178 is for storing the combined delta structure. Building a combined delta structure based on a parent and child delta structure files will be discussed in further detail later.

Continuing referring to FIG. 5, the maintenance procedure 181 is for maintaining the source module as a root delta and its subsequent changes as branch deltas in a delta structure file in each of the development environments. The maintenance procedure 181 is invoked by the users of the development environments. The maintenance procedure 181 may be implemented with utilities of a variety of standard source code management systems, provided they are compatible with the logical organization used for the delta structure files. The maintenance procedure 181 of the preferred embodiment of the present invention comprises a plurality of SCCS utilities for retrieving a particular revision/edition of the source module and for storing changes to a particular revision/edition of the source module back as change deltas to the base source module.

The replication procedure 182 is for replicating the delta structure file of a parent environment into one of its child environments, when the latest revision of the source module in the parent environment is acquired into one of the child environments. The replication procedure 182 is invoked indirectly by the user of the acquiring child environment, when he requests the acquisition. The replication procedure 182 may be implemented with any well known file copying utility. The replication procedure 182 of the preferred embodiment of the present invention comprises the standard operating system file copying utility.

The merge procedure 183 is for merging a parent delta structure file into a child delta structure file, when the latest edition of the source module in the child environment is being resynchronized to the latest revision of the source module in the parent environment, and vice versa, when the latest revision of the source module in the parent environment is being reconciled to the latest edition of the source module in the child environment. The merge procedure 183 is invoked indirectly by the users in the child environments, when they request resynchronization or reconciliation. The merge procedure 183 may be implemented in any programming language. The operational flow of the merge procedure 183 will be discussed in further detail later.

The build table procedure 184 and the build list procedure 185 are for building a combined delta relationship table, and a combined list of deltas, based on the parent and child tables of delta relationship and the parent and child lists of deltas of a parent and a child delta structure file. These build procedures, 184 and 185, are invoked by the merge procedure 183. These build procedures, 184 and 185, may be implemented in any programming language. The operational flow of these build procedures, 184 and 185, will be discussed in further detail later.

The assign level identification (ID) procedure 186 is for assigning a change identification to a delta. The assign level ID procedure 186 must be capable of factoring into consideration whether a new branch is being added to a delta structure, when assigning the change identification. The assign level ID procedure 186 is invoked by the maintenance procedure 181 and the merge procedure 183. The assign level ID procedure 186 may be implemented with the utilities of a variety of standard source code control systems, provided they are compatible with the logical organization used for the delta structure files. The assign level ID procedure 186 of the preferred embodiment of the present invention comprises a plurality of SCCS procedures for assigning change identifications to change deltas being added to existing branches or new branches.

Figure 7A:
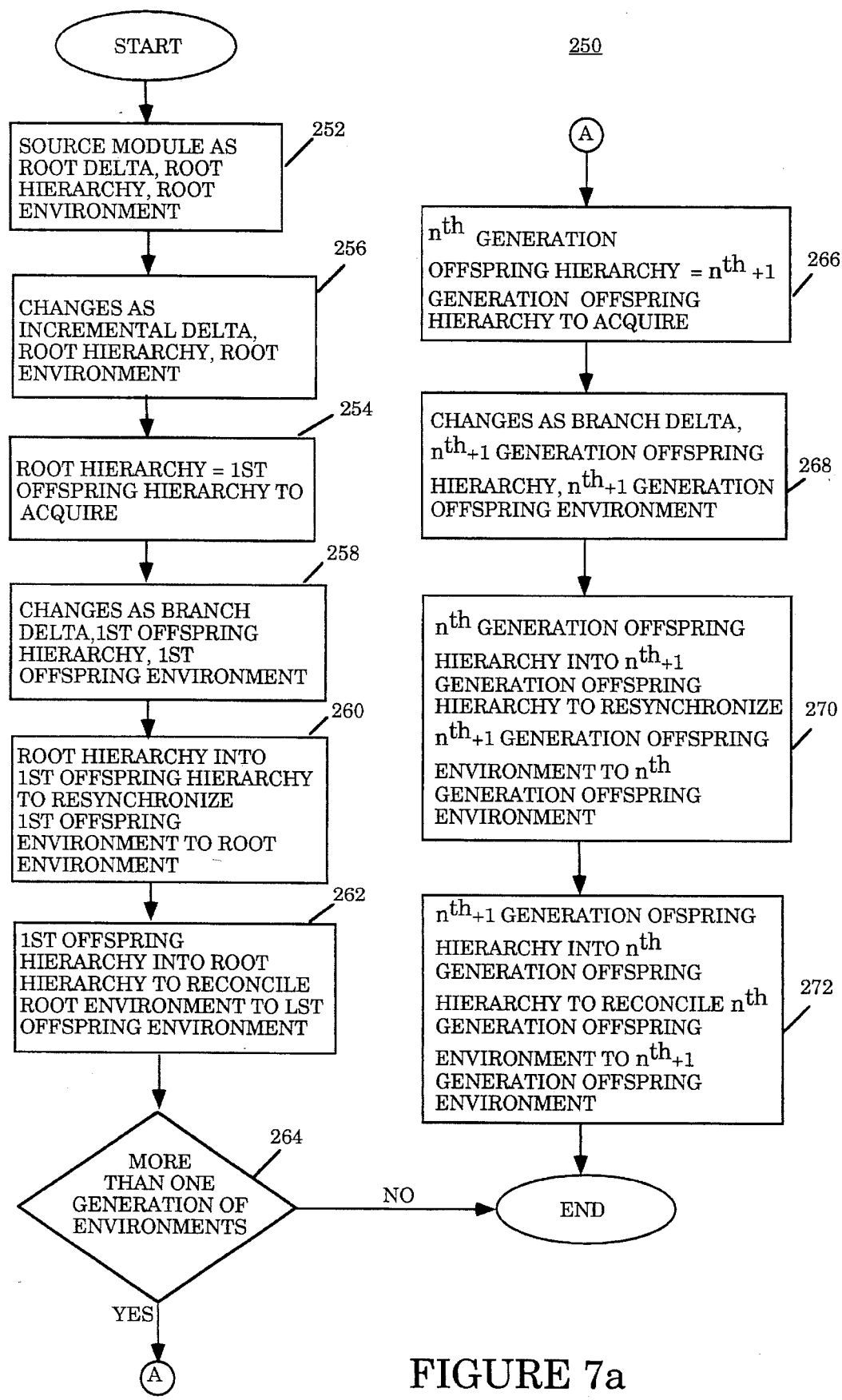
FIGS. 7a–7b illustrate the operation flow of the method and apparatus of the present invention in the context of an exemplary hierarchy of interrelated software development environments.
Figure 7B:
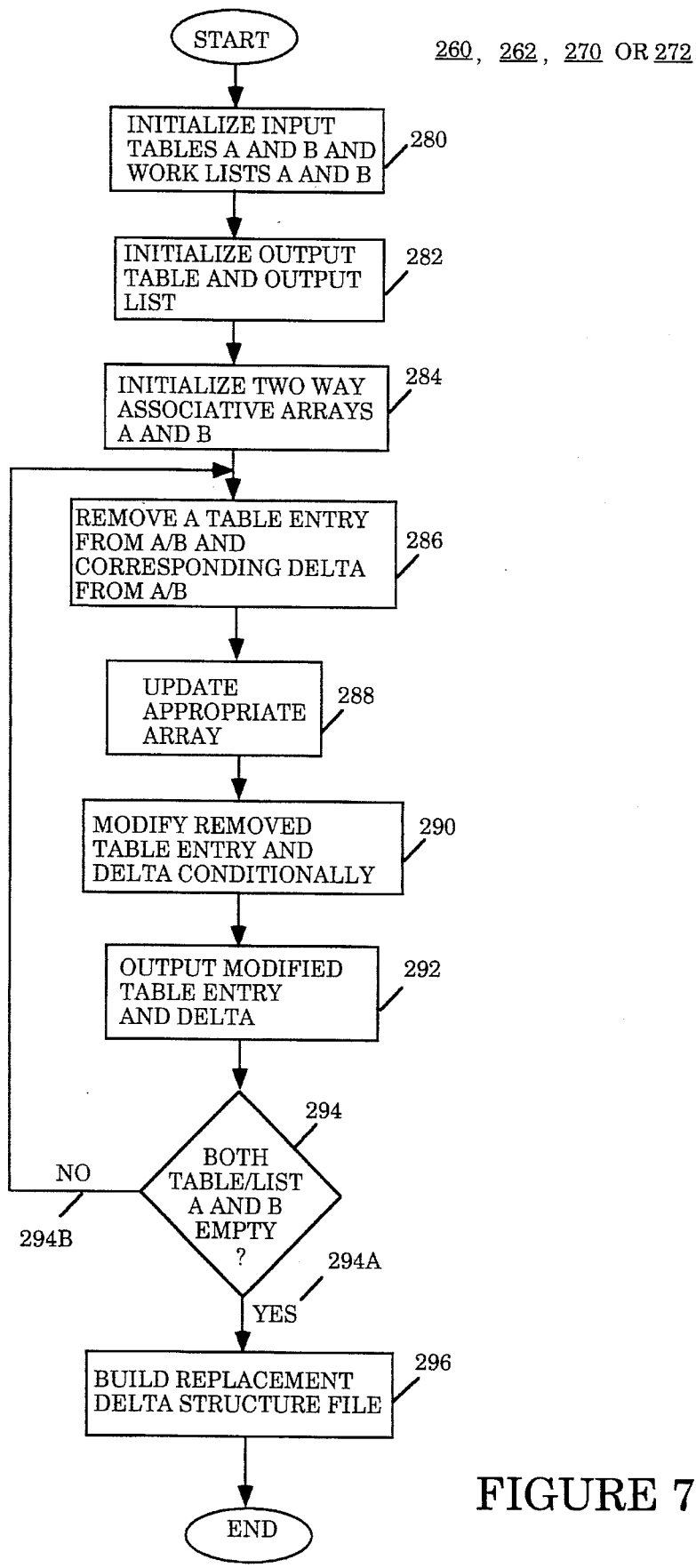

Referring now to FIGS. 7a and 7b, block diagrams illustrating the operational flow of the method and apparatus of the present invention in the context of an exemplary hierarchy of interrelated software development environments are shown. Referring first to FIG. 7a, initially, the source module is maintained as a root delta of a root hierarchy of incremental deltas in a root environment, block 252, using the maintenance procedure in conjunction with the assign level ID procedure. Subsequent changes to the source module and its revisions in the root environment are maintained as incremental deltas in the root hierarchy of incremental deltas, block 254, using the maintenance procedure in conjunction with the assign level ID procedure. The entire root hierarchy of incremental deltas is replicated to reproduce a first generation offspring hierarchy of the root hierarchy of incremental deltas in a first generation offspring environment, when the latest revision of the source module in the root environment is acquired by a first generation offspring environment, block 256, using the replication procedure. Then, subsequent changes to the source module and its editions in the first generation offspring environment are maintained as branch deltas in the first generation offspring hierarchy of the root hierarchy of incremental deltas, block 258, using the maintenance procedure in conjunction with the assign level ID procedure.

The root hierarchy of the incremental deltas is merged into the first generation offspring hierarchy of the root hierarchy of incremental deltas to resynchronize the latest edition of the source module in the first generation offspring environment to the latest revision of the source module in the root environment, block 260, using the merge procedure in conjunction with the build procedures and the assign level ID procedure. Similarly, the first generation offspring hierarchy of the root hierarchy of incremental deltas is merged into the root hierarchy of the incremental deltas to reconcile the latest revision of the source module in the root environment to the latest edition of the source module in the first generation offspring environment, block 262, using the merge procedure in conjunction with the build procedures and the assign level ID procedure.

Additionally, if the hierarchy of software development environments has more than one offspring generation of environments, a $n^{th}$ generation offspring hierarchy of the root hierarchy of incremental deltas in a $n^{th}$ generation offspring environment is replicated to reproduce a $n^{th}+1$ generation offspring hierarchy of the root hierarchy of incremental deltas in a $n^{th}+1$ generation offspring environment, a direct descendent environment of the $n^{th}$ generation offspring environment, to acquire the latest revision of the source module in the $n^{th}$ generation offspring environment into the $n^{th}+1$ generation offspring environment, block 266, using the replication procedure. Similarly, subsequent changes to the source module and its editions in the $n^{th}+1$ generation offspring environment are maintained as branch deltas of the $n^{th}+1$ generation offspring hierarchy of the root hierarchy of incremental deltas, block 268, using the maintenance procedure in conjunction with the assign level ID procedure.

Likewise, the $n^{th}$ generation offspring hierarchy of the root hierarchy of incremental deltas is merged into the $n^{th}+1$ generation offspring hierarchy of the root hierarchy of incremental deltas to resynchronize the latest edition of the source module in the $n^{th}+1$ generation offspring environment to the latest revision of the source module in the $n^{th}$ generation offspring environment, block 270, using the merge procedure in conjunction with the build procedures and the assign level ID procedure. The $n^{th}+1$ generation offspring hierarchy of the root hierarchy of incremental deltas is merged into the $n^{th}$ generation offspring hierarchy of the root hierarchy of incremental deltas to reconcile the latest revision of the source module in the $n^{th}$ generation offspring environment to the latest edition of the source module in the $n^{th}+1$ generation offspring environment, block 272, using the maintenance procedure in conjunction with the build procedures and the assign level ID procedure.

Referring now to FIG. 7b, the merging procedure merges one hierarchy of incremental deltas into another hierarchy of incremental deltas, blocks 260, 262, 270 or 272, by invoking the build table procedure and the build list procedure to build a combined table of delta relationships and a combined list of deltas, based on the two tables of delta relationships and the two lists of deltas of the delta structure files of the two hierarchies of incremental deltas respectively, blocks 280 through 294. In their presently preferred form, the build table and build list procedures build the combined table of delta relationships and the combined list of deltas concurrently. Then, the merging procedure builds a replacement delta structure file, based on the combined table of delta relationships and the combined lists of deltas, and replaces the delta structure file of the target hierarchy of incremental deltas with the replacement delta structure, block 296. If the input tables are kept in decreasing chronological order, the merge procedure reverses the order of the table entries in the combined table of delta relationships when building the replacement delta structure.

Continuing to refer to FIG. 7b, initially, the build table procedure initializes the input tables A and B to respectively equal the two tables of delta relationships, block 280, and the output table to empty, block 282. The build table procedure also initializes the two way associative arrays A and B to empty, block 284. Similarly, the build list procedure initializes work lists A and B, to respectively equal the two lists of deltas, block 280, and the output list to empty, block 282. Then the build procedure removes a table entry from one of the two input tables A and B selectively, block 286. After removing a table entry, the build procedure updates one of the arrays based on the table entry removed, block 288.

Then, the build table procedure modifies the removed table entry conditionally and outputs the modified table entry into the output table, blocks 290 and 292. Similarly, the build list procedure removes the corresponding delta from one of the two work lists A and B, block 286 after the build table procedure has finished updating one of the two arrays, conditionally modified the removed table entry and output the removed table entry into the output table. The build list procedure conditionally replaces the delta serial number of the corresponding delta. The build table and build list procedures repeat the selective removal, block 286, array update, block 288, conditional modification, block 290 and conditional output, block 292, until both input tables A and B become empty, branch 294*a*.

The build table procedure removes table entries from the input tables A and B, block 286, in the following manner. If the input table A is empty, the build table procedure removes the least recent entry of the input table B. If the input table B is empty, the build table procedure removes the least recent entry of the input table A. If both input tables A and B are non-empty and the least recent entries in input tables A and B are duplicates of each other, the build table procedure removes the least recent entry from input table B. If both input tables A and B are non-empty and the least recent entries in input tables A and B are non-duplicates of each other, the build table procedure removes the least recent entry of input tables A and B.

The build table procedure updates arrays A and B, block 288, in the following manner. If the table entry removed is the least recent entry of input table A, the build table procedure updates array A to cross reference the removed table entry from input table A and the next table entry of the output table, to each other. If the table entry removed is the least recent entry of input table B, the build table procedure updates array B to cross reference the removed table entry from input table B and the next table entry of the output table, to each other.

The build table procedure conditionally modifies the removed table entry, block 290, in the following manner. The removed table entry is modified if it is not a duplicate table entry removed from input table B, otherwise, it is discarded. For a removed table entry to be modified, the build table procedure first determines if a new branch is required. A new branch is required if the removed table entry is removed from input table B, the removed table entry is not a duplicate of any table entry in input table A, and the removed table entry's predecessor table entry cross references a table entry in the output table, which in turn cross references a table entry in input table A, furthermore, the cross referenced table entry in input table A is a predecessor table entry to another table entry of input table A, which is on the same branch the removed table entry is on.

Then, the build table procedure invokes the assign level ID procedure to generate a new change identifier for the delta based on the result of the new branch determination. The build table procedure replaces the change identifier in the removed table entry with the generated change identifier. The build table procedure also replaces the removed table entry's corresponding delta's delta serial number with a new delta serial number. The new delta serial number is set to equal to the number of table entries output into the output table so far, plus one. The build table procedure further replaces the removed table entry's corresponding delta's predecessor delta serial number with a new predecessor delta serial number retrieved from one of the two arrays. The predecessor delta serial number retrieved is equal to the delta serial number in the output table cross referenced by a delta serial number in its input table equaling the predecessor's delta serial number.

The build list procedure conditionally modifies the corresponding delta, block 290, in the following manner. The corresponding delta is modified if it is not a duplicate delta removed from work list B, otherwise it is discarded. If the corresponding delta is not discarded, the build list procedure replaces the delta serial number with a new delta serial number retrieved from arrays A or B. The new delta serial number retrieved equal to the cross referenced delta serial number in the output table.

Finally, after modifying the removed table entry and the corresponding delta as described above, the build table and build list procedures output the modified table entry and modified delta, block 292, appending them to the end of the output table and the end of the output list respectively.

Figure 8:
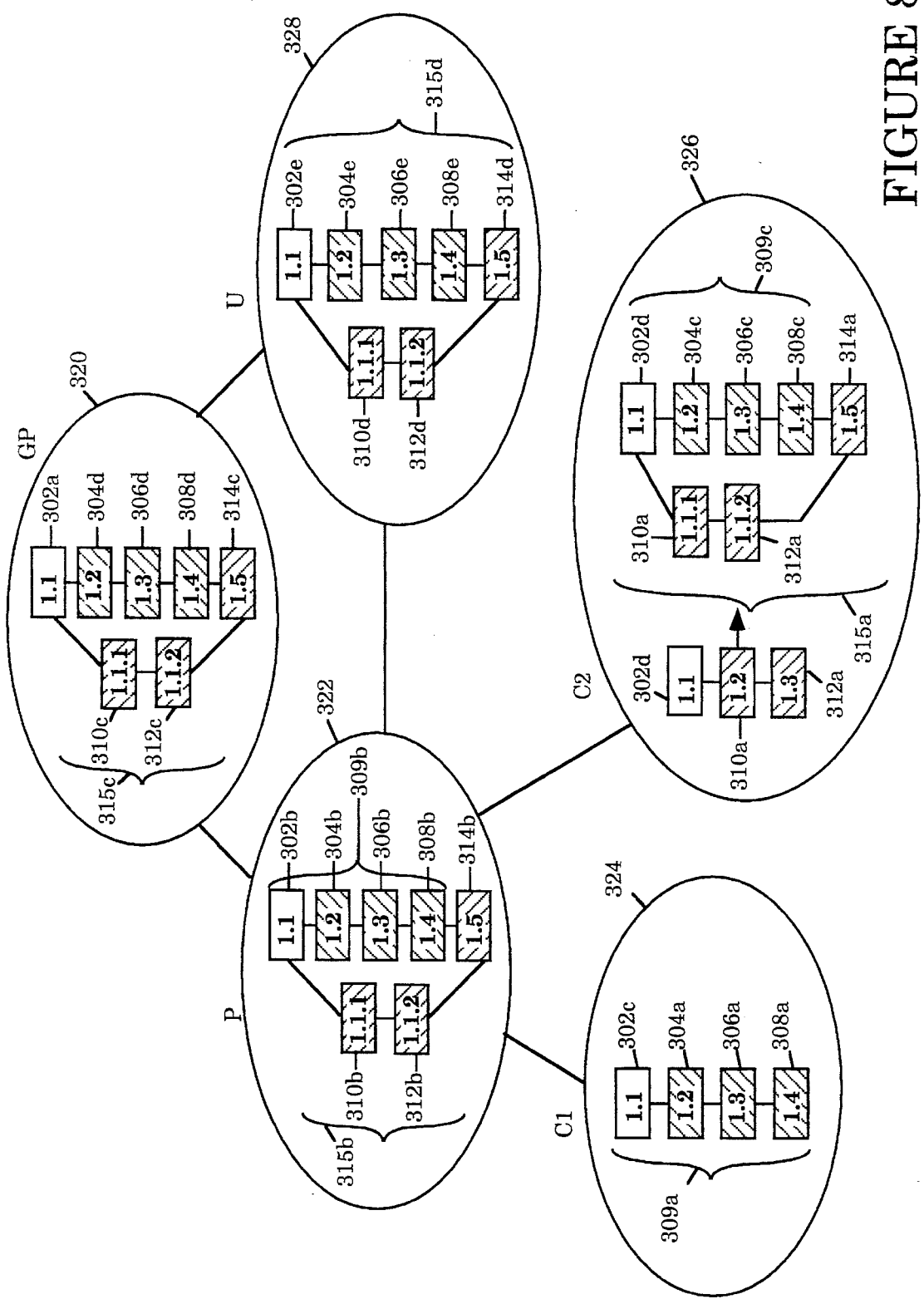
FIG. 8 illustrates application of the method and apparatus of the present invention to an exemplary scenario.

Referring now to FIG. 8, a block diagram illustrating the application of the present invention to an exemplary scenario is shown. Assume a first and a second child environment (C1 and C2), 324 and 326, each acquired revision 1.1 of a source module 302*c* and 302*d*, from their grandparent environment (GP) 320 through their parent environment (P) 322. C1 creates editions 1.2, 1.3 and 1.4, which are maintained as three incremental deltas (i.e., the changes) 304*a*, 306*a*, and 308*a*, in his environment 324. Similarly, C2 creates editions 1.2, 1.3, which are also maintained as two incremental deltas, 310*a* and 312*a*, in his environment 326.

When C1 reconciles the latest revision 1.1 in P to his latest edition 1.4, using the present invention, three revisions 1.2, 1.3 and 1.4, maintained as three separate incremental deltas, 304*b*, 306*b* and 308*b*, are created for the delta structure 309*a*, in P. Unlike the prior art, the details of the delta structure 304*a*, 306*a*, and 308*a* (i.e., the history outlining the changes made in C1) are not lost. Now, when C2 attempts to reconcile the latest revision 1.4 in P to his latest edition 1.3, using the present invention, his latest edition 1.3 is automatically resynchronize with the latest revision 1.4 in P, resulting in three new editions 1.2, 1.3 and 1.4, maintained as three incremental deltas, 304*c*, 306*c* and 308*c*, and two renumbered editions 1.1.1 and 1.1.2, maintained as branch deltas 310*a* and 312*a* in his environment 326. C2 resolves the difference, creating a new edition 1.5, maintained as an incremental delta 314*a*, in his environment 326. When C2 reconciles the latest revision 1.4 in P to his latest edition 1.5, using the present invention, three more revisions 1.1.1, 1.1.2 and 1.5, maintained as two separate branch deltas, 310*b*, 312*b* and one incremental delta 314*b*, are created for the entire delta structure 315*a*, in P. Unlike the prior art, the additional details of the delta structure 310*a* and 312*a* (i.e., the history outlining the changes made in C2) are not lost.

Similarly, if the latest revision 1.1 in GP is reconciled to the latest edition 1.5 in P, six new editions 1.2, 1.3, 1.4, 1.5, 1.1.1, and 1.1.2, maintained as four separate incremental deltas 304*d*, 306*d*, 308*d*, and 314*c*, and two branch deltas 310*c* and 312*c*, are created for the delta structure 315*b*, in GP. Thus, if an uncle environment (U) 328, subsequently acquires the latest revision 1.5 in GP, he sees all the changes, maintained as separate incremental and branch deltas 315*d*, in U. He has access to all the change history outlining the changes made in C1 and C2.

While the invention has been substantially described in terms of a preferred embodiment in the context of controlling changes to a source module in software development, those skilled in the art will recognize that the invention is not limited to the context or the embodiment described herein. In particular, the present invention may be applied to any number of source modules and interrelated software environments of other topologies. The present invention may be applied to document or object change control provided changes to a document or an object may be maintained and manipulated in delta structures as the source module described therein. The method and apparatus of the present invention can be practiced with modification and alteration within the spirit and scope of the appended claims.

What is claimed is

1. In a computer system comprising a parent and a child development environment, said parent and child environments having a first and a second delta hierarchy representing a source module and changes to said source module individually known to said parent and child environments respectively, a method for merging said first and second delta hierarchies together that preserves all delta relationships of said changes individually known to said parent and child environments without the need for computer assisted tracking, said method comprising the steps of:

(a) storing deltas in a first and a second list of deltas and storing descriptive entries corresponding to said deltas in a first and second table of descriptive entries of said first and second delta hierarchies;

(b) initializing a first and a second work list and a first and a second work table to equal said first and second list of deltas and first and said second table of descriptive entries of said first and second delta hierarchies respectively, said first and second lists of deltas being chronologically identified within a first and a second development environments in identical manners, and said first and second table of descriptive entries being time ordered and correspondingly describing said first and second lists of deltas respectively;

(c) initializing an output table, an output list, a first and a second two way associative array corresponding to said first and second work tables to empty, for sequentially receiving modified non-duplicate descriptive entries of said first and second work tables, modified non-duplicate deltas of said first and second lists of deltas, and cross reference entries cross referencing descriptive entries of said first and second work tables and said output table to each other;

(d) retrieving descriptive entries and their corresponding deltas from said first and second work tables and said first and second work lists, outputting a two way cross reference entry to the corresponding one of said first and second two way associative arrays for each descriptive entry which has been retrieved, as the descriptive entry and its corresponding delta are retrieved, cross referencing said descriptive entry which has been retrieved to the next descriptive entry of said output table, said step of retrieving being performed one descriptive entry and its corresponding delta at a time, in a predetermined least recent entry manner, until all descriptive entries and their corresponding deltas have been retrieved from said first and second work tables and said first and second work deltas;

(e) discarding each descriptive entry which has been retrieved and its corresponding delta, as its two way cross reference entry is output, if the descriptive entry which has been retrieved is a duplicate of a second descriptive entry which has been retrieved in the other work table;

(f) modifying each said descriptive entry which has been retrieved and its corresponding delta not discarded, after its discard or not discard determination is made, outputting each of said descriptive entries which have been retrieved and modified and its corresponding modified delta into said output table and said output list respectively, as the modifications are made, said step of modifying being performed in accordance to whether a new branch is to be created in the merged hierarchy for the corresponding delta of the descriptive entry which has been retrieved and not discarded, and the number of descriptive entries which have been retrieved having been output to the output table so far, and furthermore utilizing said cross reference entries.

2. The method as set forth in claim 1, wherein, said step (d) comprises the steps off (d .1) retrieving the least recent descriptive entry of said second work table and its corresponding delta from said second work table and said second work list if said first work table is empty;

(d .2) retrieving the least recent descriptive entry of said first work table and its corresponding delta from said first work table and said first work list if said second work table is empty;

(d .3) retrieving the least recent descriptive entry of said second work table and its corresponding delta from said second work table and said second work list if both of said first and second work tables are non-empty and the least recent descriptive entries of said first and second work tables are duplicates; and (d .4) retrieving the least recent descriptive entry of said first work table and its corresponding delta from said first work table and said first work list if both of said first and second work tables are non-empty and the least recent descriptive entries of said first and second work tables are not duplicates.

3. The method as set forth in claim 2, wherein said step (f) further comprises the step of creating a new branch for the corresponding delta of the descriptive entry which has been removed and not discarded in said step (f) if said descriptive entry which has been retrieved and not discarded was retrieved from said second work table, and said descriptive entry which has been retrieved and not discarded has a predecessor descriptive entry in said second work table cross referencing a descriptive entry in said output table, which cross references a descriptive entry in said first work table, and if said cross referenced descriptive entry in said first work table is a predecessor descriptive entry to another descriptive entry in said first work table, which is on the same branch said descriptive entry which has been removed and not discarded is on.

4. The method as set forth in claim 3, wherein, said step (f) comprises the steps off ((f) .1) replacing an existing change identifier in said descriptive entry not discarded with a new change identifier, said existing and new change identifiers indicating revision/edition levels of said source module in the pre-merge and merged hierarchies respectively, said new change identifier being generated in accordance to whether a new branch is to be created for the corresponding delta of said descriptive entry in the merged hierarchy;

((f) .2) replacing a first existing delta serial number in said descriptive entry not discarded with a first new unique delta serial number, said first existing and new delta serial numbers identifying the corresponding delta in the pre-merge and merged hierarchies respectively, said first new unique delta serial number being generated in accordance to the number of descriptive entries having been output to said output table so far;

((f) .3) replacing a second existing delta serial number in said descriptive entry not discarded with a second new unique delta serial number, said second existing and new delta serial numbers identifying the corresponding delta's predecessor delta in the pre-merge and merged hierarchies respectively, said second new unique delta serial number being retrieved from the corresponding one of said first and second two way cross reference arrays, said second new unique delta serial number being equal to the first new unique delta number of the cross referenced descriptive entry of said output table, whose first existing delta serial number of the cross referencing descriptive entry of said first and second work tables equals said second existing delta serial number.

5. The method as set forth in claim 4 further comprises the steps of:

merging said second delta hierarchy into said first delta hierarchy to reconcile the latest revision of said source module in said parent environment to the latest edition of said source module in said child environment; and replacing said first delta hierarchy in said parent environment with said output table.

6. The method as set forth in claim 5, further comprising the steps of:

merging said first delta hierarchy into said second delta hierarchy to resynchronize the latest edition of said source module in said child environment of the latest revision of said source module in said parent environment; and replacing said second delta hierarchy in said child environment with said output table instead.

7. The method as set forth in claim 6 further comprises the step of automatically triggering said performance of said steps (a) through (f) to merge said first delta hierarchy into said second delta hierarchy to resynchronize the latest edition of said source module in said child environment of the latest revision of said source module in said parent environment in response to an attempt to perform said steps (a) through (f) to merge said second delta hierarchy into said first delta hierarchy to reconcile the latest revision of said source module in said parent environment to the latest edition of said source module in said child environment, and said second delta hierarchy was originally created using said first delta hierarchy, which has subsequently changed.

8. In a computer system comprising a parent and a child development environment, said parent and child environments having a first and a second delta hierarchy representing a source module and changes to said source module individually known to said parent and child environments respectively, an apparatus for merging said first and second delta hierarchies together that preserves all delta relationships of said changes individually known to said parent and child environments without the need for computer assisted tracking, said apparatus comprising:

(a) storage means for storing deltas in a first and a second list of deltas and storing descriptive entries corresponding to said deltas in a first and second table of descriptive entries of said first and second delta hierarchies;

(b) first initialization means coupled to said parent and child environments for initializing a first and a second work list and a first and a second work table to equal a first and a second list of deltas and a first and a second table of descriptive entries of said first and second delta hierarchies respectively, said first and second lists of deltas being chronologically identified within a first and second development environments in identical manners, and said first and second table of descriptive entries being time ordered and correspondingly describing said first and second lists of deltas respectively;

(c) second initialization means for initializing an output table, an output list, a first and a second two way associative array corresponding to said first and second work tables to empty, for sequentially receiving modified non-duplicate descriptive entries of said first and second work tables, modified non-duplicate deltas of said first and second lists of deltas, and cross reference entries cross referencing descriptive entries of said first and second work tables and said output table to each other;

(d) retrieval means coupled to said first initialization means for retrieving descriptive entries and their corresponding deltas from said first and second work tables and said first and second work lists, and first output means coupled to said removal means and said second initialization means for outputting a two way cross reference entry to the corresponding one of said first and second two way associative arrays for each descriptive entry which has been retrieved, as the descriptive entry and its corresponding delta are retrieved, cross referencing said descriptive entry which has been retrieved to the next descriptive entry of said output table, said step of retrieving being performed one descriptive entry and its corresponding delta at a time, in a predetermined least recent entry manner, until all descriptive entries and their corresponding deltas have been retrieved from said first and second work tables and said first and second work deltas;

(e) discard means coupled to said first output means for discarding each descriptive entry which has been retrieved and its corresponding delta, as its two way cross reference entry is output, if the descriptive entry which has been retrieved is a duplicate of a second descriptive entry which has been retrieved in the other work table;

(f) modification means coupled to said discard means for modifying each said descriptive entry which has been retrieved and its corresponding delta not discarded, after its discard or not discard determination is made, outputting each of said descriptive entries which have been retrieved and modified and its corresponding modified delta into said output table and said output list respectively, as the modifications are made, said step of modifying being performed in accordance to whether a new branch is to be created in the merged hierarchy for the corresponding delta of the descriptive entry which has been retrieved and not discarded, and the number of descriptive entries which have been retrieved having been output to the output table so far, and furthermore utilizing said cross reference entries.

9. The apparatus as set forth in claim 8, wherein, said retrieval means retrieves (d. 1) the least recent descriptive entry of said second work table and its corresponding delta from said second work table and said second work list if said first work table is empty;

(d. 2) the least recent descriptive entry of said first work table and its corresponding delta from said first work table and said first work list if said second work table is empty;

(d. 3) the least recent descriptive entry of said second work table and its corresponding delta from said second work table and said second work list if both of said first and second work tables are non-empty and the least recent descriptive entries of said first and second work tables are duplicates; and (d. 4) the least recent descriptive entry of said first work table and its corresponding delta from said first work table and said first work list if both of said first and second work tables are non-empty and the least recent descriptive entries of said first and second work tables are not duplicates.

10. The apparatus as set forth in claim 9, wherein, said modification means further comprises means for determining that a new branch is to be created for the corresponding delta of the descriptive entry which has been retrieved not discarded if said descriptive entry which has been retrieved not discarded was removed from said second work table, and said descriptive entry which has been retrieved not discarded has a predecessor descriptive entry in said second work table cross referencing a descriptive entry in said output table, which cross references a descriptive entry in said rust work table, furthermore, said cross referenced descriptive entry in said first work table is a predecessor descriptive entry to another descriptive entry in said first work table, which is on the same branch said descriptive entry not discarded is on.

11. The apparatus as set forth in claim 10, wherein, said modification means replaces:

(h. 1) an existing change identifier in said descriptive entry not discarded with a new change identifier, said existing and new change identifiers indicating revision/ edition levels of said source module in the pre-merge and merged hierarchies respectively, said new change identifier being generated in accordance to whether a new branch is to be created for the corresponding delta of said descriptive entry not discarded in the merged hierarchy;

(h. 2) a first existing delta serial number in said descriptive entry with a first new unique delta serial number, said first existing and new delta serial numbers identifying the corresponding delta in the pre-merge and merged hierarchies respectively, said first new unique delta serial number being generated in accordance to the number of descriptive entries having been output to said output table so far;

(h. 3) a second existing delta serial number in said descriptive entry with a second new unique delta serial number, said second existing and new delta serial numbers identifying the corresponding delta's predecessor delta in the pre-merge and merged hierarchies respectively, said second new unique delta serial number being retrieved from the corresponding one of said first and second two way cross reference arrays, said second new unique delta serial number being equal to the first new unique delta number of the cross referenced descriptive entry of said output table, whose first existing delta serial number of the cross referencing descriptive entry of said first and second work tables equals said second existing delta serial number.

12. The apparatus as set forth in claim 11, further comprising: merging means for merging said second delta hierarchy into said first delta hierarchy to reconcile the latest revision of said source module in said parent environment to the latest edition of said source module in said child environment; and replacement means coupled to said parent environment and said second output means for replacing said first delta hierarchy in said parent environment with said output table.

13. The apparatus as set forth in claim 12 further comprising: merging means for merging said first delta hierarchy into said second delta hierarchy to resynchronize the latest edition of said source module in said child environment of the latest revision of said source module in said parent environment, and said replacement means being further coupled to said child environment replaces said second hierarchy in said child environment with said output table instead, said usage of said apparatus to merge said first delta hierarchy into said second delta hierarchy to resynchronize the latest edition of said source module in said child environment of the latest revision of said source module in said parent environment is automatically triggered in response to an attempt to use said apparatus to merge said second delta hierarchy into said first delta hierarchy to reconcile the latest revision of said source module in said parent environment to the latest edition of said source module in said child environment, and said second delta hierarchy was originally created using said first delta hierarchy, which has subsequently changed.

14. A computer system comprising:

(a) a parent development environment having a first execution means for executing means, and a first delta hierarchy representing a source module and changes to said source module known to said parent environment;

(b) a child development environment having a second execution means for executing means, and a second delta hierarchy representing said source module and changes to said source module known to said child environment;

(c) merging means to be executed by either said first or second execution means for merging said first and second delta hierarchies together that preserves all delta relationships of said changes individually known to said parent and child environments, said merging means including (c. 1) first initialization means to be executed by either said first or second execution means for initializing a first and a second work list and a first and a second work table to equal a first and a second list of deltas and a first and a second table of descriptive entries of said first and second delta hierarchies respectively, said first and second lists of deltas being chronologically identified within a first and second development environments in identical manners, and said first and second table of descriptive entries being time ordered and correspondingly describing said first and second lists of deltas respectively;

(c. 2) second initialization means to be executed by either said first or second execution means for initializing an output table, an output list, a first and a second two way associative array corresponding to said first and second work tables to empty, for sequentially receiving modified non-duplicate descriptive entries of said first and second work tables, modified non-duplicate deltas of said first and second lists of deltas, and cross reference entries cross referencing descriptive entries of said first and second work tables and said output table to each other;

(c. 3) retrieval means to be executed by either said first or second execution means for retrieving descriptive entries and their corresponding deltas from said first and second work tables and said first and second work lists, outputting a two way cross reference entry to the corresponding one of said first and second two way associative arrays for each descriptive entry which has been retrieved, as the descriptive entry and its corresponding delta are retrieved, cross referencing said descriptive entry which has been retrieved to the next descriptive entry of said output table, said step of retrieving being performed one descriptive entry and its corresponding delta at a time, in a predetermined least recent entry manner, until all descriptive entries and their corresponding deltas have been retrieved from said first and second work tables and said first and second work deltas;

(c. 4) discard means to be executed by either said first or second execution means for discarding each descriptive entry which has been retrieved and its corresponding delta, as its two way cross reference entry is output, if the descriptive entry which has been retrieved is a duplicate of a second descriptive entry which has been retrieved in the other work table;

(c. 5) modification means to be executed by either said first or second execution means for modifying each said descriptive entry which has been retrieved and its corresponding delta not discarded, after its discard or not discard determination is made, outputting each of said descriptive entries which have been retrieved and modified and its corresponding modified delta into said output table and said output list respectively, as the modifications are made, said step of modifying being performed in accordance to whether a new branch is to be created in the merged hierarchy for the corresponding delta of the descriptive entry which has been retrieved and not discarded, and the number of descriptive entries which have been retrieved having been output to the output table so far, and furthermore utilizing said cross reference entries and a processor coupled to said memory, said processor for running merging means.

15. The computer system as set forth in claim 14, wherein, said retrieval means retrieve (c.3.1) the least recent descriptive entry of said second work table and its corresponding delta from said second work table and said second work list if said first work table is empty;

(c.3.2) the least recent descriptive entry of said first work table and its corresponding delta from said first work table and said first work list if said second work table is empty;

(c.3.3) the least recent descriptive entry of said second work table and its corresponding delta from said second work table and said second work list if both of said first and second work tables are non-empty and the least recent descriptive entries of said first and second work tables are duplicates; and (c.3.4) the least recent descriptive entry of said first work table and its corresponding delta from said first work table and said first work list if both of said first and second work tables are non-empty and the least recent descriptive entries of said first and second work tables are not duplicates.

16. The computer system as set forth in claim 15, wherein, said modification means further comprises means for determining that a new branch is to be created for the corresponding delta of the descriptive entry which has been retrieved and not discarded if said descriptive entry which has been retrieved and not discarded was removed from said second work table, and said descriptive entry which has been retrieved and not discarded has a predecessor descriptive entry in said second work table cross referencing a descriptive entry in said output table, which cross references a descriptive entry in said first work table, furthermore, said cross referenced descriptive entry in said first work table is a predecessor descriptive entry to another descriptive entry in said first work table, which is on the same branch said descriptive entry which has been retrieved and not discarded is on.

17. The computer system as set forth in claim 16, wherein, said modification means replaces:

(c. 5.1) an existing change identifier in said descriptive entry not discarded with a new change identifier, said existing and new change identifiers indicating revision/ edition levels of said source module in the pre-merge and merged hierarchies respectively, said new change identifier being generated in accordance to whether a new branch is to be created for the corresponding delta of said descriptive entry not discarded in the merged hierarchy;

(c. 5.2) a first existing delta serial number in said descriptive entry not discarded with a first new unique delta serial number, said first existing and new delta serial numbers identifying the corresponding delta in the pre-merge and merged hierarchies respectively, said first new unique delta serial number being generated in accordance to the number of descriptive entries having been output to said output table so far;

(c. 5.3) a second existing delta serial number in said descriptive entry with a second new unique delta serial number, said second existing and new delta serial numbers identifying the corresponding delta' predecessor delta in the pre-merge and merged hierarchies respectively, said second new unique delta serial number being retrieved from the corresponding one of said first and second two way cross reference arrays, said second new unique delta serial number being equal to the first new unique delta number of the cross referenced descriptive entry of said output table, whose first existing delta serial number of the cross referencing descriptive entry of said first and second work tables equals said second existing delta serial number.

* * * * *

UNITED STATES PATENT AND TRADEMARK OFFICE
CERTIFICATE OF CORRECTION

PATENT NO.   : 5,481,722
DATED        : January 2, 1996
INVENTOR(S)  : Glenn Skinner It is certified that error appears in the above-identified patent and that said Letters Patent is hereby corrected as shown below:

In column 3 at line 19, please delete " of " (3rd occurrence).

In column 14 at line 13, please delete " off " and insert -- of --.

In column 17 at line 22, please delete " rust " and insert -- first --.

Signed and Sealed this

Seventh Day of July, 1998

Attest:

BRUCE LEHMAN

Attesting Officer

Commissioner of Patents and Trademarks